(12) United States Patent
Oshima et al.

(10) Patent No.: US 8,451,402 B2
(45) Date of Patent: May 28, 2013

(54) COLOR CONVERSION SHEET, ILLUMINATION DEVICE, AND DISPLAY DEVICE

(75) Inventors: Yoshihiro Oshima, Kanagawa (JP); Tsubasa Tsukahara, Tokyo (JP); Yasushi Ito, Kanagawa (JP); Naoji Nada, Tokyo (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 12/719,383

(22) Filed: Mar. 8, 2010

(65) Prior Publication Data

US 2010/0238381 A1  Sep. 23, 2010

(30) Foreign Application Priority Data

Mar. 23, 2009 (JP) .................... 2009-070156

(51) Int. Cl.
*G02F 1/133603* (2012.01)

(52) U.S. Cl.
USPC ............. 349/71; 313/501; 313/502; 313/503; 313/504

(58) Field of Classification Search
None
See application file for complete search history.

(56) References Cited

U.S. PATENT DOCUMENTS

| 2007/0273274 A1* | 11/2007 | Horiuchi et al. | 313/504 |
| 2008/0316410 A1* | 12/2008 | Fujii et al. | 349/139 |
| 2010/0133989 A1* | 6/2010 | Stiles et al. | 313/504 |

FOREIGN PATENT DOCUMENTS

| JP | 2004352928 | 12/2004 |
| JP | 2005108635 | 4/2005 |
| JP | 2006049657 | 2/2006 |
| JP | 2006163939 | 6/2006 |

* cited by examiner

*Primary Examiner* — Thanh-Nhan P Nguyen
(74) *Attorney, Agent, or Firm* — K&L Gates LLP

(57) ABSTRACT

A color conversion sheet realizing suppression of deterioration in a color conversion layer and improvement in light extraction efficiency is provided. The color conversion sheet includes: a color conversion layer converting a part of first color light as incident light to second color light having a wavelength longer than that of the first color light; and a pair of sealing sheets sandwiching the color conversion layer from a light incidence side and a light emitting side and each having an inorganic stack film on a substrate. Reflectance of the sealing sheet on the light incidence side to the second color light is higher than that to the first color light, and reflectance of the sealing sheet on the light emitting side to the first color light is higher than that to the second color light.

20 Claims, 11 Drawing Sheets

WITHOUT SiOx FILM

WITH SiO FILM ABOUT 5nm

COLOR CONVERSION SHEET, ILLUMINATION DEVICE, AND DISPLAY DEVICE

CROSS REFERENCES TO RELATED APPLICATIONS

The present application contains subject matter related to that disclosed in Japanese Priority Patent Application JP 2009-070156 filed in the Japan Patent Office on Mar. 23, 2009, the entire content of which is hereby incorporated by reference.

BACKGROUND

The present application relates to a color conversion sheet enabling white light to be extracted using blue light as excitation light and to an illumination device and a display device using the same.

A liquid crystal display (LCD) is used as a thin-type display device. In the liquid crystal display, a backlight for illuminating an entire liquid crystal panel from the back side is used. According to the structure of the backlight, liquid crystal displays are broadly divided into the direct type and the edge light type. In the edge light type, light is allowed to enter from the side face of a light guide plate and propagate on the inside, thereby performing surface light emission on the top surface of the guide plate. In the direct type, surface light emission is performed by disposing a plurality of cold cathode fluorescent lamps (CCFLs) in the same plane. In displays at present, the direct type is the main stream (see Japanese Unexamined Patent Application Publication No. 2005-108635).

On the other hand, in recent years, attention is being paid to a backlight using light emitting diodes (LEDs) of three colors of red (R), blue (B), and green (G) aiming for enlargement of color gamut. In such a backlight, by disposing a plurality of light emitting diodes of three colors at predetermined intervals and simultaneously turning on them, white light is extracted by mixing the colors.

In the backlight using light emitting diodes of three colors, however, in the case of extracting uniform white color, a space for mixing the color light is necessary, so that the backlight becomes thicker by the space. To address the disadvantage, there is proposed a method of extracting white light by using only a light emitting diode of blue as a light source and combining a phosphor layer performing color conversion using blue light as excitation light with the blue light emitting diode (see, for example, Japanese Unexamined Patent Application Publication No. 2006-49657). According to the method, as compared with the case of using light emitting diodes of three colors, the backlight is made thinner.

As such a phosphor, for example, a phosphor obtained by adding a rare-earth material to a sulfide material is used. The phosphor, however, has a drawback such that it is sensitive to moisture vapor in atmosphere and deteriorates when exposed to moisture vapor. To address the drawback, there are proposed a method of hermetically sealing the inside of an exterior cap of a blue light emitting diode chip by applying and forming a phosphor layer on the inner face of the cap (Japanese Unexamined Patent Application Publication No. 2004-352928) and a method of sealing a phosphor layer by sandwiching it by two glass substrates (Japanese Unexamined Patent Application Publication No. 2006-163939).

SUMMARY

Since the material of the phosphor is expensive, it is important to obtain great effect by a small amount of the material. That is, it is desired to realize a color conversion sheet with improved efficiency of extracting light from a phosphor layer (color conversion layer) on the basis of incident excitation light.

It is therefore desirable to provide a color conversion sheet with suppressed deterioration in a color conversion layer and with improved light extraction efficiency, and an illumination device and a display device each using the same.

A color conversion sheet according to an embodiment includes: a color conversion layer converting a part of first color light as incident light to second color light having a wavelength longer than that of the first color light; and a pair of sealing sheets sandwiching the color conversion layer from a light incidence side and a light emitting side and each having an inorganic stack film on a substrate. Reflectance of the sealing sheet on the light incidence side in the pair of sealing sheets to the second color light is higher than that to the first color light, and reflectance of the sealing sheet on the light emitting side to the first color light is higher than that to the second color light.

An illumination device according to an embodiment includes the color conversion sheet according to an embodiment; and a light source unit emitting first color light toward the color conversion sheet.

A display device according to an embodiment includes the color conversion sheet according to an embodiment between a display panel displaying an image and a light source unit.

In the color conversion sheet, the illumination device, and the display device according to embodiment, when first color light enters a color conversion layer, a part of the first color light is converted to second color light. By mixture of the second color light and the first color light passing through the color conversion layer without being color-converted, another color light is extracted. Since the color conversion layer is sandwiched by a pair of sealing sheets each having an inorganic stack film on a substrate from the light incidence side and the light emitting side, invasion of gas such as moisture vapor into the color conversion layer is suppressed. Since the reflectance of the sealing sheet on the light incidence side to the second color light is higher than that to the first color light, the first color light enters the color conversion layer more easily, and light which escapes to the light incidence side of the second color light is reflected toward the light emitting side more easily. On the other hand, since the reflectance of the sealing sheet on the light emitting side to the first color light is higher than that to the second color light, the second color light is extracted more easily and, on the other hand, the first color light which passes the color conversion layer without being converted is reflected by the second inorganic film and returns to the color conversion layer side more easily.

In the pair of sealing sheets, preferably, each of the first and second inorganic stack films has a silicon nitride (SiN) film or an aluminum oxide ($Al_2O_3$) film on the substrate. Since the silicon nitride film and the aluminum oxide film have gas barrier property, invasion of moisture vapor and the like to the color conversion layer is suppressed more effectively.

Preferably, a silicon oxide film (SiOx: $1.5 \leq x \leq 1.7$) is provided between the silicon nitride film (or aluminum oxide film) as described above and the substrate. Although the silicon nitride film and the aluminum oxide film have the gas barrier property, they also have a drawback such that a crack tends to occur under high-temperature and high-moisture conditions. By providing the silicon oxide film having oxygen defect, adhesion to the substrate of the silicon nitride film (or the aluminum oxide film) improves, and occurrence of a crack is suppressed.

In the color conversion sheet, the illumination device, and the display device according to embodiment, the color conversion layer is sandwiched by a pair of sealing sheets from a light incidence side and a light emitting side, so that the color conversion layer is prevented from being exposed to moisture vapor or the like. Since the reflectance of the sealing sheet on the light incidence side and that of the sealing sheet on the light emitting side have different predetermined characteristics, first color light as incidence light is efficiently taken in the phosphor layer, and second color light generated by the color conversion is efficiently extracted. Therefore, deterioration in the color conversion layer is suppressed, and the light extraction efficiency improves. That is, with a small amount of phosphor, efficient light extraction with little waste is realized.

Additional features and advantages are described herein, and will be apparent from the following Detailed Description and the figures.

DETAILED DESCRIPTION

The present application will be described in detail below with reference to the drawings, according to an embodiment. Description will be given in the following order.

1. Embodiment: an example of a phosphor sheet using a silicon oxide film, a silicon nitride film, and a silicon dioxide film as an inorganic stack film of a sealing sheet 2. Application Example: an example of an illumination device and a display device each having a phosphor sheet 3. Modification 1: an example of using a silicon oxide film, an aluminum oxide film, and a titanium dioxide film as an organic stack film of a sealing sheet 4. Modification 2: an example of using a silicon oxide film, an aluminum oxide film, and a silicon dioxide film as an inorganic stack film of a sealing sheet 5. Modification 3: an example of using a light guide plate as an illumination device Configuration of Phosphor Sheet 10

Figure 1:
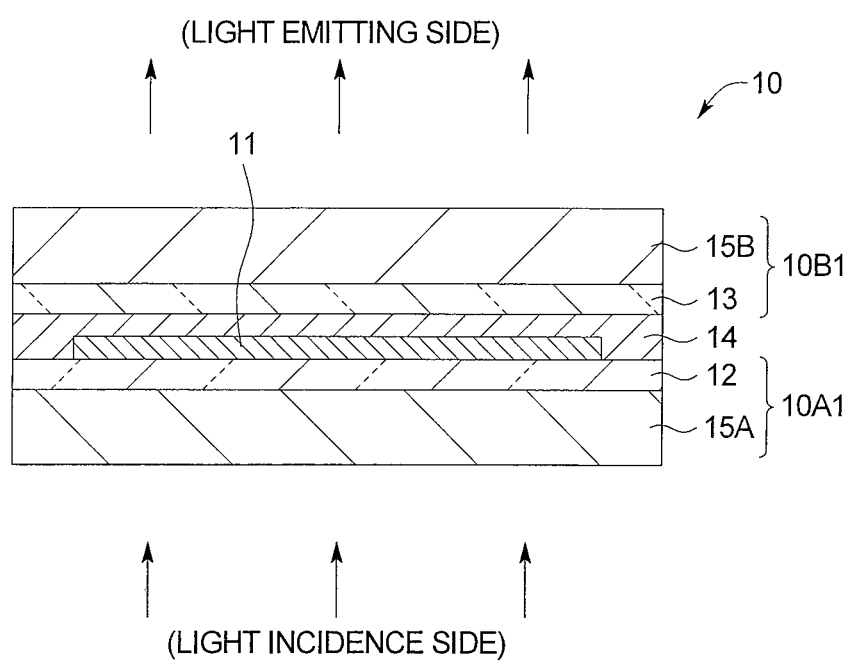
FIG. 1 is a cross section illustrating a schematic configuration of a phosphor sheet according to an embodiment.

FIG. 1 illustrates a sectional structure of a phosphor sheet (color conversion sheet) 10 according to an embodiment. The phosphor sheet 10 allows, for example, blue light to enter, performs color conversion using the blue light as excitation light to thereby enable white light to be extracted. The phosphor sheet 10 is obtained by sandwiching a phosphor layer (color conversion layer) 11 by a pair of sealing sheets 10A1 and 10B1. The sealing sheets 10A1 and 10B1 are adhered to each other by an adhesion layer 14. By the adhesion layer 14, the phosphor layer 11 is sealed between the sealing sheets 10A1 and 10B1.

The phosphor layer 11 color-converts a part of incident color light to color light having a longer wavelength and is obtained by dispersing phosphor in a resin material. Examples of the resin material include acrylic resin and butyral resin. The phosphor performs color conversion (energy conversion) using, for example, blue light as excitation light and contains at least one kind of a phosphor material generating green, red, or yellow light. Concrete examples of a phosphor material of yellow conversion are $(Y,Gd)_3(Al,Ga)_5O_{12}:Ce^{3+}$ (commonly known as YAG:Ce$^{3+}$), and $\alpha$-SiAlON:Eu$^{2+}$. A phosphor material of yellow or green conversion is, for example, $(Ca,Sr,Ba)_2SiO_4:Eu^{2+}$. A phosphor material of green conversion is, for example, $SrGa_2S_4:Eu^{2+}$, $\beta$-SiAlON:Eu$^{2+}$, $Ca_3Sc_2Si_3O_{12}:Ce^{3+}$, or the like. A phosphor material of red conversion is, for example, $(Ca,Sr,Ba)S:Eu^{2+}$, $(Ca,Sr,Ba)_2Si_5N_8:Eu^{2+}$, $CaAlSiN_3:Eu^{2+}$, or the like. In the following, the case of using blue light as incident light on the phosphor sheet 10, that is, as excitation light of the phosphor layer 11 and performing color conversion to red and green light in the phosphor layer 11 will be described as an example.

Desirably, the adhesion layer 14 is made of, for example, UV curing adhesive, thermoset adhesive, adhesive agent, hot-melt agent, or the like and has moisture vapor barrier property.

The sealing sheets 10A1 and 10B1 suppress invasion of moisture vapor to the phosphor layer 11 and are disposed so as to face each other while sandwiching the phosphor layer 11 from the light incidence side and the light emitting side. In this case, the sealing sheet 10A1 is set on the light incidence side, and the sealing sheet 10B1 is set on the light emitting side. The sealing sheet 10A1 has a first inorganic stack film 15A obtained by stacking a plurality of thin films made of an inorganic material on a substrate 12 (the side opposite to the phosphor layer 11). The sealing sheet 10B1 has a second inorganic stack film 15B on a substrate 13 (the side opposite to the phosphor layer 11). The materials, thicknesses, and the like of the films in the first and second inorganic stack films 15A and 15B are properly set so that predetermined reflectance characteristics which are different from each other on the light incidence side and the light emitting side are displayed. The concrete configuration of the sealing sheets 10A1 and 10B1 will be described below.

Stack Structure of Sealing Sheet 10A1 (Light Incidence Side)

Figure 2A:
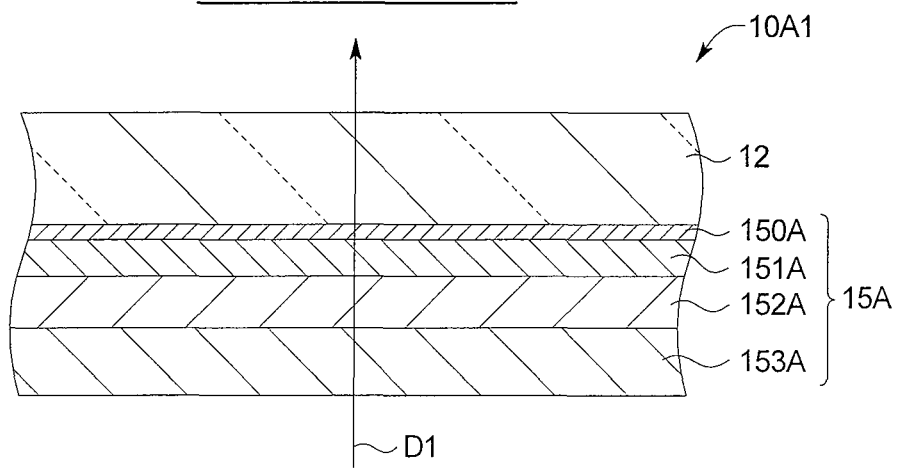
FIGS. 2A and 2B are diagrams illustrating a concrete stack structure and reflectance characteristic of a sealing sheet (light incidence side) illustrated in FIG. 1.
Figure 2B:
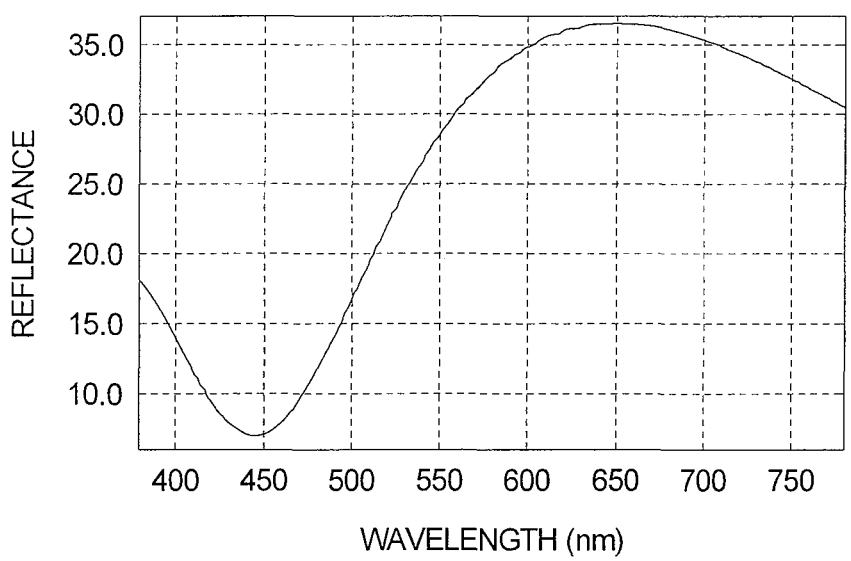

FIG. 2A illustrates a sectional stack structure of the sealing sheet 10A1 on the light incidence side, and FIG. 2B illustrates the characteristic of reflectance at wavelength of the sealing sheet 10A1. The sealing sheet 10A1 is obtained by stacking, on the substrate 12, as the first inorganic stack layer 15A, for example, a silicon oxide (SiOx: $1.5 \leq x \leq 1.7$) film 150A, a silicon nitride (SiN) film 151A, a silicon dioxide (SiO$_2$) film 152A, and a SiN film 153A in this order. In the sealing sheet 10A1, the direction from the SiN film 153A to the substrate 12 is a blue light transmission direction (D1), and blue light enters from the under face of the SiN film 153A.

Preferably, the substrate 12 has gas barrier property and is made of a material having transparency, workability, heat resistance property, and the like. Examples of the material of the substrate 12 include a thermoplastic resin such as polyethylene terephthalate (PET), polycarbonate (PC), polymethylmethacrylate (PMMA), polystyrene (PS), polyethylene naphthalate (PEN), polyether sulfone (PES) and cyclic amorphous polyolefin, polyfunctional acrylate, polyfunctional polyolefin, unsaturated polyester, epoxy resin, and the like. In particular, it is more preferable to use a material whose deterioration caused by a blue light emitting diode is small such as polyethylene terephthalate, polycarbonate, polymethylmethacrylate, or polystyrene.

The SiOx film 150A is provided to increase adhesion between the substrate 12 and the inorganic film (in this case, the SiN film 151A) formed on the SiOx film 150A and is made of silicon oxide having oxygen defect. Preferably, the value of "x" in the SiOx film 150A lies in the range of 1.5 to 1.7 both inclusive. The reason is, although it will be described in detail later, that if the value of "x" is too small (for example, x<1.5), the transmittance decreases and, on the other hand, if the value of "x" is too large (for example, x>1.7), excellent adhesion is not obtained. The SiN film 151A functions as a barrier layer suppressing invasion of moisture vapor or the like to the phosphor layer 11.

For example, the thickness of the substrate 12 is 100 µm, that of the SiOx film 150A is 2 nm, that of the SiN film 151A is 70 nm, that of the $SiO_2$ film 152A is 100 nm, and that of the SiN film 153A is 100 nm.

By the first inorganic stack film 15A, in the sealing sheet 10A1, for example, the reflectance characteristic as illustrated in FIG. 2B is displayed. Specifically, the reflectance in green light (about 550 nm) and red light (about 650 nm) is higher than that in blue light (about 450 nm). In the embodiment, PET is used as the substrate 12. Usually, the PET has reflectance of about 10%. Consequently, by the stack structure of the first inorganic stack film 15A, light reflection in blue light is suppressed and, on the other hand, light reflection in green and red light is promoted. To be concrete, the peak of the transmittance is around 420 nm to 480 nm, and the peak of the reflectance is around 500 nm to 680 nm.

Stack Structure of Sealing Sheet 10B1 (Light Emitting Side)

Figure 3A:
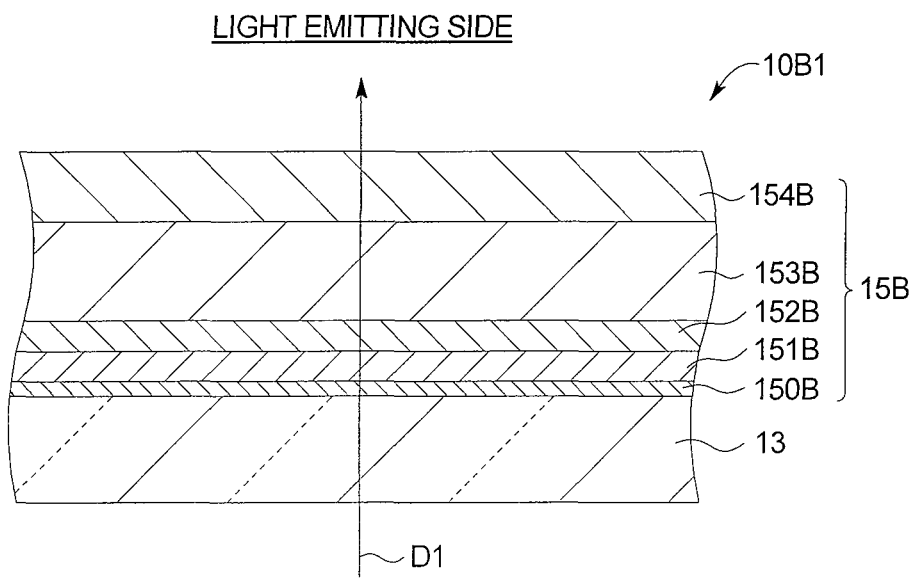
FIGS. 3A and 3B are diagrams illustrating a concrete stack structure and reflectance characteristic of a sealing sheet (light emitting side) illustrated in FIG. 1.
Figure 3B:
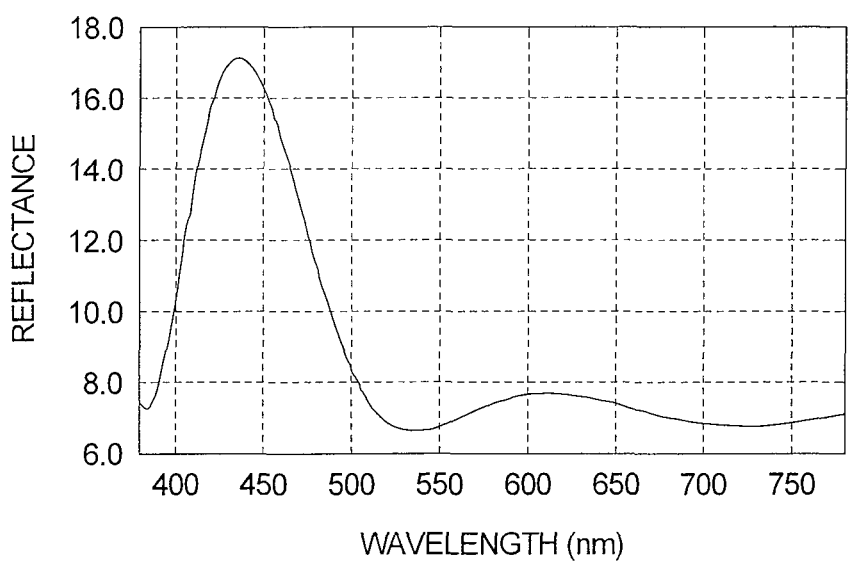

FIG. 3A illustrates a sectional stack structure of the sealing sheet 10B1 on the light emitting side, and FIG. 3B illustrates the characteristic of reflectance at wavelength of the sealing sheet 10B1. The sealing sheet 10B1 is obtained by stacking, on the substrate 13, as the second inorganic stack layer 15B, for example, a SiOx film 150B, a SiN film 151B, a $SiO_2$ film 152B, a SiN film 153B, and a $SiO_2$ film 154B in this order. In the sealing sheet 10B1, the direction from the substrate 13 toward the $SiO_2$ film 154B is the blue light transmission direction (D1), and white light as mixture of blue, green, and red light is emitted from the top face of the $SiO_2$ film 154B. The material of the substrate 13 is similar to that of the substrate 12 in the sealing sheet 10A1. In this case, the substrate 13 is made of PET. The functions of the SiOx film 150B and the SiN film 151B are similar to those of the SiOx film 150A and the SiN film 151A in the sealing sheet 10A1.

For example, the thickness of the substrate 13 is 100 µm, that of the SiOx film 150B is 2 nm, that of the SiN film 151B is 50 nm, that of the $SiO_2$ film 152B is 30 nm, that of the SiN film 153B is 200 nm, and that of the $SiO_2$ film 154B is 100 nm.

By such a second inorganic stack film 15B, in the sealing sheet 10B1, for example, the reflectance characteristic as illustrated in FIG. 3B is displayed. Specifically, the reflectance in blue light is higher than that in green and red light. In the embodiment, PET having reflectance of about 10% is used as the substrate 13. Consequently, by the stack structure of the second inorganic stack film 15B, light reflection of blue light is promoted and, on the other hand, light reflection of green and red light is suppressed. To be concrete, the peak of the reflectance is around 420 nm to 480 nm, and the peak of the transmittance is around 500 nm to 680 nm.

Method of Manufacturing Phosphor Sheet 10

Figure 4A:
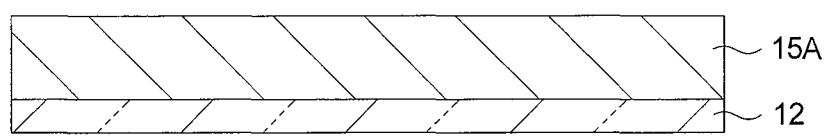
FIGS. 4A to 4C are diagrams for explaining a process of manufacturing a phosphor sheet illustrated in FIG. 1.

The phosphor sheet 10 is manufactured, for example, as follows. First, as illustrated in FIG. 4A, by forming the first inorganic stack film 15A on the substrate 12, the sealing sheet 10A1 is formed. At this time, on the substrate 12 made of the above-described material, for example, by using reactive sputtering or the like, the SiOx film 150A, the SiN film 151A, the $SiO_2$ film 152A, and the SiN film 153A are formed in order so as to have the above-described thickness. Although not illustrated, in a manner similar to the sealing sheet 10A1, by forming the second inorganic stack film 15B on the substrate 13, the sealing sheet 10B1 is formed.

Figure 4B:
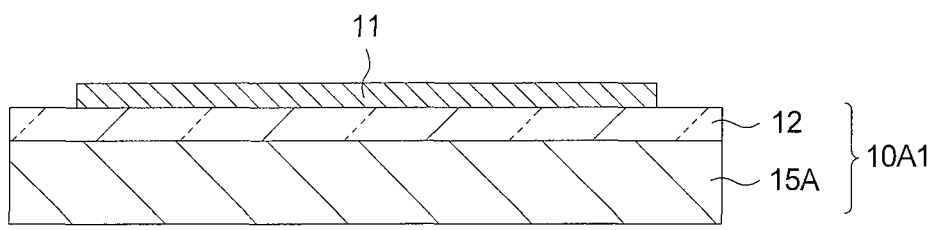

Subsequently, as illustrated in FIG. 4B, on the surface (the surface on the side opposite to the first inorganic stack film 15A) of the substrate 12 of the sealing sheet 10A1, the phosphor layer 11 made of the above-described material is formed by, for example, screen printing. At this time, the above-described phosphor and resin material are mixed in a solvent into a paste state. As the solvent, for example, toluene, methyl ethyl ketone, terpineol, or the like is used. The paste is applied on a region other than the peripheral part of the surface of the substrate 12 and dried.

Figure 4C:
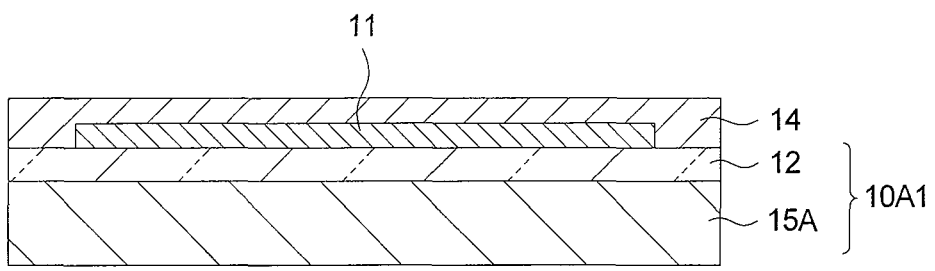

After that, as illustrated in FIG. 4C, the adhesive layer 14 made of the above-described material is applied so as to cover the formed phosphor layer 11 on the substrate 12 side of the sealing sheet 10A1.

Finally, the sealing sheet 10B1 is joined on the adhesive layer 14 so that the substrate 12 of the sealing sheet 10A1 and the substrate 13 of the sealing sheet 10B1 face each other, and the sealing sheets 10A1 and 10B1 are adhered to each other. As a result, the phosphor layer 14 is sealed between the sealing sheets 10A1 and 10B1, thereby completing the phosphor sheet 10 illustrated in FIG. 1.

Action and Effect of Phosphor Sheet 10

In the phosphor sheet 10, for example, when blue light enters the sealing sheet 10A1, the blue light passes through the first inorganic stack film 15A and the substrate 12 in order and enters the phosphor layer 11. A part of the blue light which entered the phosphor layer 11 is converted to red light or green light in the phosphor layer 11. When the green light and red light obtained by the color conversion and the blue light passed through the phosphor layer 11 without being color-converted enters the sealing sheet 10B1, the light passes through the substrate 13 and the second inorganic stack film 15B in order and is extracted as white light obtained by mixture of the three colors from the top of the second inorganic stack film 15B.

By sandwiching the phosphor layer 11 by the sealing sheet 10A1 having the first inorganic stack film 15A and the sealing sheet 10B1 having the second inorganic stack film 15B, invasion of gas such as moisture vapor to the phosphor layer 11 is suppressed. In the embodiment, particularly, the SiN film 151A is provided in the first inorganic stack film 15A and the SiN film 151B is provided in the second inorganic stack film 15B, so that invasion of gas to the phosphor layer 11 is effectively suppressed.

Since the reflectance of the sealing sheet 10A1 on the light incidence side in the red light and the green light is higher than that in the blue light as illustrated in FIG. 2B, the blue light passes through the first inorganic stack film 15A more easily and, on the other hand, the red light and the green light are reflected by the first inorganic stack film 15A more easily. That is, the blue light enters the phosphor layer 11 more easily, and light which escapes to the light incidence side in the red light and the green light generated by the phosphor layer 11 is reflected toward the light emitting side more easily.

On the other hand, since the reflectance of the sealing sheet 10B1 on the light emitting side to the blue light is higher than that to the red light and the green light as illustrated in FIG. 3B, the red light and the green light passes through the second inorganic stack film 15B more easily and, on the other hand, the blue light is reflected by the second inorganic stack film 15B more easily. That is, the red light and the green light goes out from the top of the second inorganic stack film 15B more easily. On the other hand, the blue light passing through the phosphor layer 11 without being converted is reflected by the second inorganic stack film 15B and returns to the phosphor layer 11 side more easily.

Further, the SiOx film 150A is also provided between the substrate 12 and the SiN film 151A in the first inorganic stack film 15A, and the SiOx film 150B is also provided between the substrate 13 and the SiN film 151B in the second inorganic stack film 15B. The SiN films 151A and 151B functioning as a gas barrier layer have a drawback that adhesion to the substrates 12 and 13 is poor, and a crack tends to occur in high-temperature and high-moisture conditions. With respect to this point, in the embodiment, the SiOx film 150A is provided between the substrate 12 and the SiN film 151A in the sealing sheet 10A1. Consequently, adhesion to the substrate 12 of the SiN film 151A is increased, and occurrence of a crack in the SiN film 151A is suppressed. The sealing sheet 10B1 is similar to the above. Therefore, durability of the sealing sheets 10A1 and 10B1 improves.

Figure 5A:
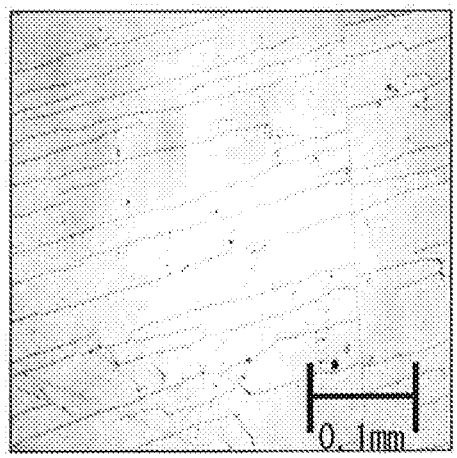
FIGS. 5A and 5B are photographs of the surface of a SiN film in the case where no silicon oxide film is formed and in the case where a silicon oxide film is formed, respectively.
Figure 5B:
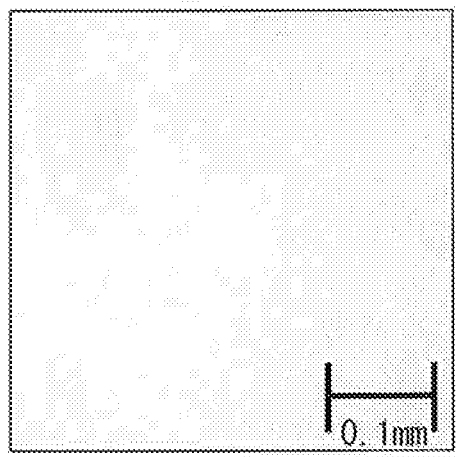

FIG. 5A illustrates a result of an environment test of the case where the SiOx film is not formed, that is, the case where the SiN film is formed directly on the substrate made of PET. On the other hand, FIG. 5B illustrates a result of an environment test of the case where the SiOx film is formed between the substrate and the SiN film, that is, of the embodiment. To be specific, the environment test was carried out in the environment of high temperature (85° C.) and high moisture (95%), the thickness of the SiOx film was set to about 5 mm, and the value of "x" was set to 1.5. As illustrated in FIG. 5A, cracks occur in the SiN film in the case where no SiOx film is formed. On the contrary, as illustrated in FIG. 5B, cracks hardly occur in the case where the SiOx film is formed. Therefore, it is understood that by providing the sealing sheets 10A1 and 10B1 with the SiOx films 150A and 150B, occurrence of cracks in the SiN films 151A and 151B is suppressed.

When the value of "x" in the SiOx films 150A and 150B is in the range of 1.5 to 1.7 both inclusive, sufficient transmittance is maintained, and excellent adhesion to the substrate is obtained on the basis of the following experiment results. Total ten samples (samples 1 to 10) in which the value of "x" lies in the range of 0 to 2 were manufactured on a substrate by reactive sputtering, and the adhesion and transmittance (%) of the samples were measured. Table 1 illustrates the result of the measurement. As sputter gas, argon (Ar) and oxygen (O2) were used. By changing the flow ratio of Ar and O2 as illustrated in Table 1, the value of "x" was changed. The value of "x" in each of the samples was measured by using X-ray photoelectron spectroscopy. The other sputter parameters were: power was set to 2.0 kW, and the film thickness was set to 100 nm to 200 nm.

TABLE 1

| | Sputter parameters | | | | |
|---|---|---|---|---|---|
| Sample | Ar (sccm) | $O_2$ (sccm) | X value (SiOx) | Adhesion | Transmittance (%) |
| 1 | 60 | 0 | 0 | good | Less than 90 |
| 2 | 50 | 10 | 1.1 | | |
| 3 | 48 | 12 | 1.2 | | |
| 4 | 45 | 15 | 1.5 | good | 90 |
| 5 | 44 | 16 | 1.6 | | 91 |
| 6 | 43 | 17 | 1.7 | | 92 |
| 7 | 42 | 18 | 1.9 | poor | 94 |
| 8 | 39 | 21 | 2 | | 94 |
| 9 | 36 | 24 | 2 | | 94 |
| 10 | 33 | 27 | 2 | | 94 |

As illustrated in Table 1, in the samples 1 to 6 (the value of "x" is 1.7 or less) in which the oxygen flow rate at the time of sputtering was relatively low, excellent adhesion was displayed. However, in the samples 1 to 3 (the value of "x" is 1.2 or less) out of the samples 1 to 6, the transmittance was less than 90% which is unpreferable for an optical member. Therefore, the value of "x" is preferably 1.5 to 1.7. In this case, while suppressing light loss in the SiOx films 150A and 150B, excellent adhesion is obtained.

As described above, in the embodiment, by the phosphor layer 11, white light is extracted using blue light as excitation light. Since the phosphor layer 11 is sealed by the sealing sheets 10A1 and 10B1, the phosphor layer 11 is prevented from being exposed to water moisture or the like. Since the reflectance of the sealing sheet 10A1 on the light incidence side and that of the sealing sheet 10B1 on the light emitting side have different predetermined characteristics, the blue light as the excitation light is efficiently taken in the phosphor layer 11, and green light and red light obtained by the color conversion is efficiently extracted. Therefore, deterioration in the phosphor layer 11 is suppressed, and the light extraction efficiency improves. That is, with a small amount of phosphor, efficient light extraction with little waste is realized. Since the phosphor material is generally expensive, the cost is also reduced.

Application Example

Figure 6:
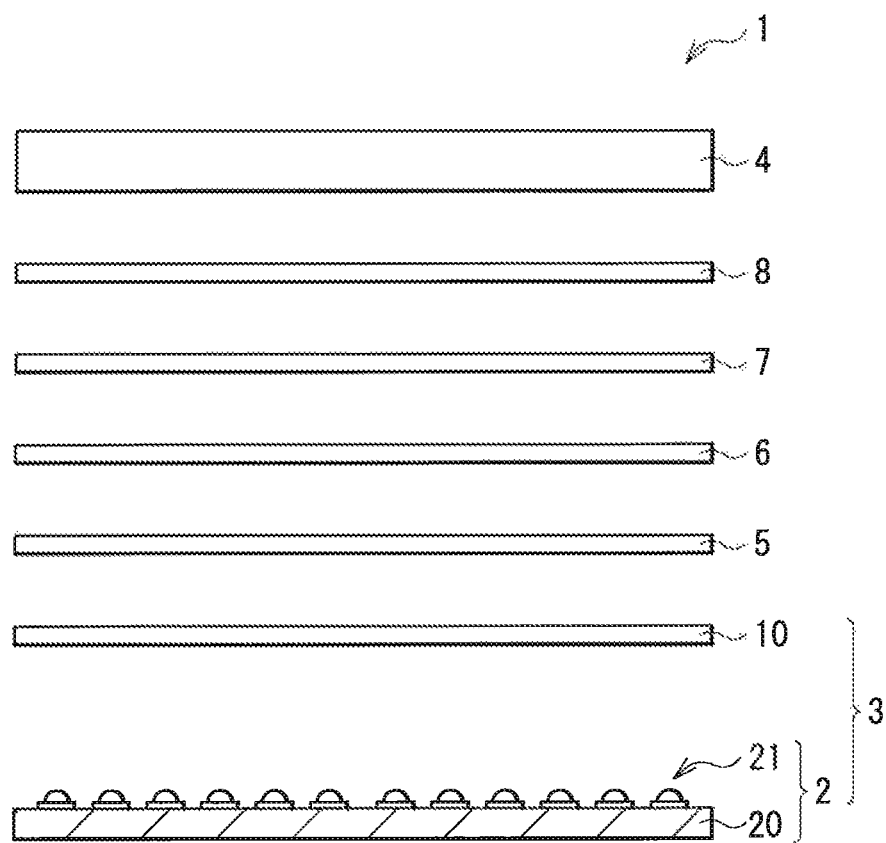
FIG. 6 is a cross section illustrating a schematic configuration of a display device (illumination device) according to an application example of the phosphor sheet illustrated in FIG. 1.

The phosphor sheet 10 may be applied to, for example, a display device 1 (illumination device 3) as illustrated in FIG. 6.

The display device 1 is, for example, a liquid crystal display (LCD) and has the illumination device 3 as a backlight obtained by disposing the phosphor sheet 10 just above a light source unit 2, and a display panel 4 displaying an image on the basis of image data. Between the illumination device 3 and the display panel 4, in order from the illumination device 3 side, various optical function films such as a diffuser 5, a diffusion film 6, a lens film 7, and a reflection-type polarization film 8 are disposed.

In the light source unit 2, a plurality of blue LEDs 21 are disposed at predetermined intervals on a substrate 20. From each of the blue LEDs 21 of the light source unit 2, blue light is emitted toward the phosphor sheet 10.

The display panel 4 is obtained by, for example, sealing a liquid crystal layer between a TFT substrate on which pixel electrodes, TFT (Thin Film Transistor) elements, and the like are formed and an opposed substrate on which opposed electrodes, color filters, and the like are formed (those elements are not illustrated). On the light incidence side and the light emitting side of the display panel 4, polarizers (not illustrated) are adhered so that their polarization axes are orthogonal to each other.

The diffuser 5 and the diffusion film 6 are provided to diffuse incident light to make an intensity distribution uniform. The lens film 7 is obtained by arranging a plurality of prism-shaped projections and has the function of condensing incident light. The reflection-type polarization film 8 is provided to transmit one of polarized light and reflect the other polarized light downward (to the illumination device 3 side) to reuse light. The reflection-type polarization film 8 is provided to increase the light use efficiency.

In the display device 1, blue light emitted from the blue LED 21 is used as excitation light of the phosphor sheet 10. By using the blue light, white light is extracted from the top face of the phosphor sheet 10, that is, from the illumination device 3. The white light is diffused by the diffuser 5 and the diffusion film 6, condensed by the lens film 7, passes through the reflection-type polarization film 8, and is applied to the display panel 4. The light applied in such a manner is modulated on the basis of image data by the display panel 4, and an image is displayed.

Next, modifications (modifications 1 to 3) of the present invention will be described. In the following, the same reference numerals are designated to components similar to those of the foregoing embodiment, and their description will not be repeated.

In the foregoing embodiment, the case of using the SiOx film, the SiN film, and the $SiO_2$ film are used as inorganic material films in the first and second inorganic stack films 15A and 15B has been described as an example. However, the inorganic material films used in the present invention are not limited to those films. For example, although the SiN film is formed as the layer having the gas barrier function in the embodiment, in place of the SiN film, an aluminum oxide ($Al_2O_3$) film may be provided. In the following modifications 1 and 2, a concrete stack structure using the $Al_2O_3$ film as the gas barrier layer will be described. In the modifications 1 and 2, the stack structure of inorganic stack films in each of the sealing sheets on the light incidence side and the light emitting side is different from that of the foregoing embodiment and, accordingly, the reflectance characteristics in the sealing sheets are different from each other. The other configuration is similar to that of the foregoing embodiment.

Modification 1

Stack Structure of Sealing Sheet 10A2 (Light Incidence Side)

Figure 7A:
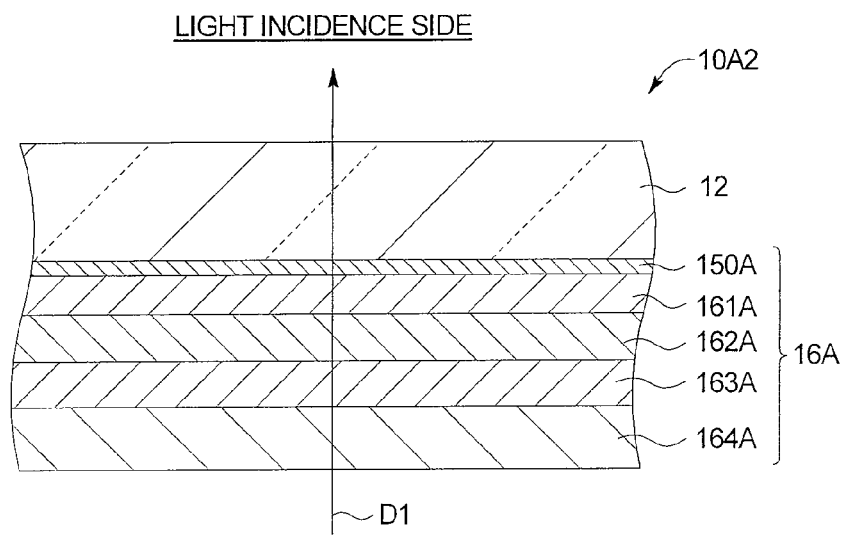
FIGS. 7A and 7B are diagrams illustrating a concrete stack structure and reflectance characteristic of a sealing sheet (light incidence side) according to modification 1.
Figure 7B:
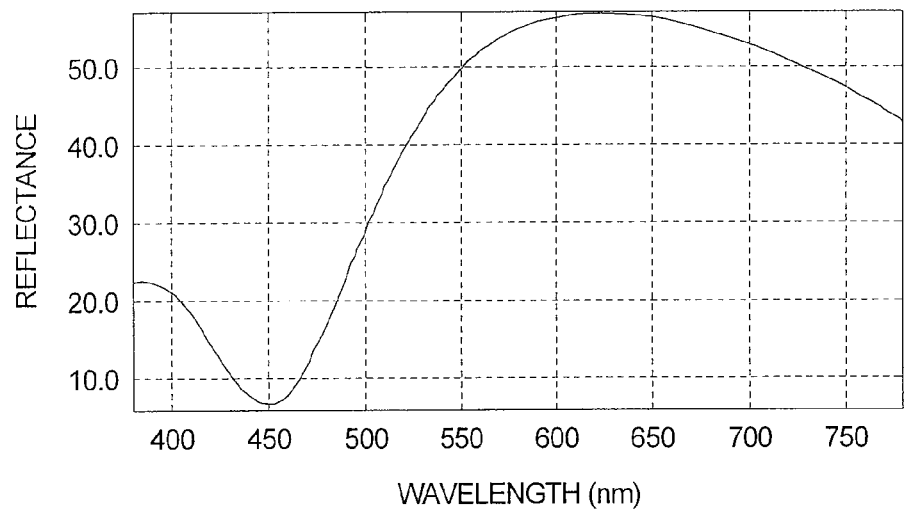

FIG. 7A illustrates a sectional stack structure of a sealing sheet 10A2 (the light incidence side) according to modification 1, and FIG. 7B illustrates the characteristic of reflectance at wavelength of the sealing sheet 10A2. The sealing sheet 10A2 is obtained by stacking, on the substrate 12, as a first inorganic stack layer 16A, for example, the SiOx film 150A, a titanium dioxide ($TiO_2$) film 161A, an $Al_2O_3$ film 162A, a $TiO_2$ film 163A, and an $Al_2O_3$ film 164A in this order. In the sealing sheet 10A2, the direction from the $Al_2O_3$ film 164A toward the substrate 12 is the blue light transmission direction (D1), and the blue light enters from the under face of the $Al_2O_3$ film 164A. In the modification, in the sealing sheet 10A2, the $Al_2O_3$ film 162A functions as a gas barrier layer suppressing invasion of moisture vapor and the like to the phosphor layer 11.

The thickness of each of the inorganic material films is as follows. The thickness of the $TiO_2$ film 161A is 80.59 nm, that of the $Al_2O_3$ film 162A is 82.1 nm, that of the $TiO_2$ film 163A is 64.85 nm, and that of the $Al_2O_3$ film 164A is 92.59 nm. The substrate 12 (thickness 100 μm) and the SiOx film 150A (thickness 2 nm) are similar to those of the foregoing embodiment.

By such a first inorganic stack film 16A, in the sealing sheet 10A2, for example, the reflectance characteristic as illustrated in FIG. 7B is displayed. Specifically, the reflectance in green light and red light is higher than that in blue light. Also in the modification, in a manner similar to the sealing sheet 10A1 in the embodiment, by the stack structure of the first inorganic stack film 16A, light reflection in blue light is suppressed and, on the other hand, light reflection in green and red light is promoted.

Stack Structure of Sealing Sheet 10B2 (Light Emitting Side)

Figure 8A:
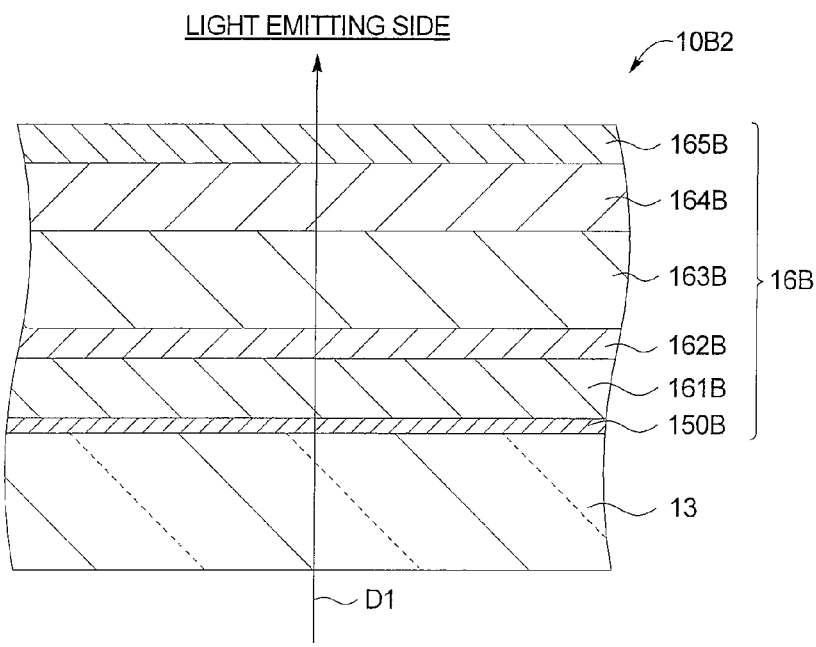
FIGS. 8A and 8B are diagrams illustrating a concrete stack structure and reflectance characteristic of a sealing sheet (light emitting side) according to the modification 1.
Figure 8B:
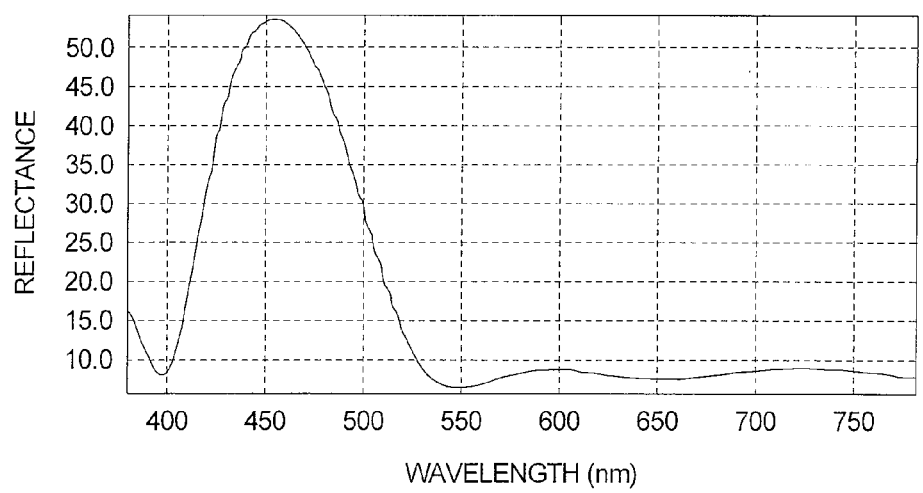

FIG. 8A illustrates a sectional stack structure of a sealing sheet 10B2 on the light emitting side, and FIG. 8B illustrates the characteristic of reflectance at wavelength of the sealing sheet 10B2. The sealing sheet 10B2 is obtained by stacking, on the substrate 13, as a second inorganic stack layer 16B, for example, the SiOx film 150B, an $Al_2O_3$ film 161B, a $TiO_2$ film 162B, an $Al_2O_3$ film 163B, a $TiO_2$ film 164B, and an $Al_2O_3$ film 165B in this order. In the sealing sheet 10B2, the direction from the substrate 13 to the $Al_2O_3$ film 165B is the blue light transmission direction (D1), and the white light as mixture of the blue, green, and red light goes out from the top face of the $Al_2O_3$ film 165B. In the sealing sheet 10B2, the $Al_2O_3$ film 161B functions as a gas barrier layer suppressing invasion of moisture vapor and the like to the phosphor layer 11.

The thickness of each of the inorganic material films is as follows. For example, the thickness of the $Al_2O_3$ film 161B is 100.31 nm, that of the $TiO_2$ film 162B is 69.53 nm, that of the $Al_2O_3$ film 163B is 202.45 nm, that of the $TiO_2$ film 164B is 141.27 nm, and that of the $Al_2O_3$ film 165B is 57.67 nm. The substrate 13 (thickness 100 μm) and the SiOx film 150B (thickness 2 nm) are similar to those of the foregoing embodiment.

By such a second inorganic stack film 16B, in the sealing sheet 10B2, for example, the reflectance characteristic as illustrated in FIG. 8B is displayed. Specifically, the reflectance in blue light is higher than the reflectance in green light and red light. Also in the modification, in a manner similar to the sealing sheet 10B1 in the embodiment, by the stack structure of the second inorganic stack film 16B, light reflection in blue light is promoted and, on the other hand, light reflection in green and red light is suppressed.

In the modification, the sealing sheets 10A2 and 10B2 have the predetermined reflectance characteristics similar to those of the embodiment, so that blue light as excitation light is efficiently taken in the phosphor layer 11 and, on the other hand, green light and red light generated by color conversion is efficiently extracted. Therefore, effects similar to those of the foregoing embodiment are obtained. That is, the first and second inorganic stack films 16A and 16B may employ a stack structure using an $Al_2O_3$ film as a gas barrier layer and also using a $TiO_2$ film. Although the $Al_2O_3$ film has a property that a crack tends to occur in high-temperature high-moisture conditions like the SiN film in the embodiment, by providing a SiOx film as an adhesion layer between the $Al_2O_3$ film and the substrate in a manner similar to the embodiment, occurrence of a crack is suppressed.

Modification 2

Stack Structure of Sealing Sheet 10A3 (Light Incidence Side)

Figure 9A:
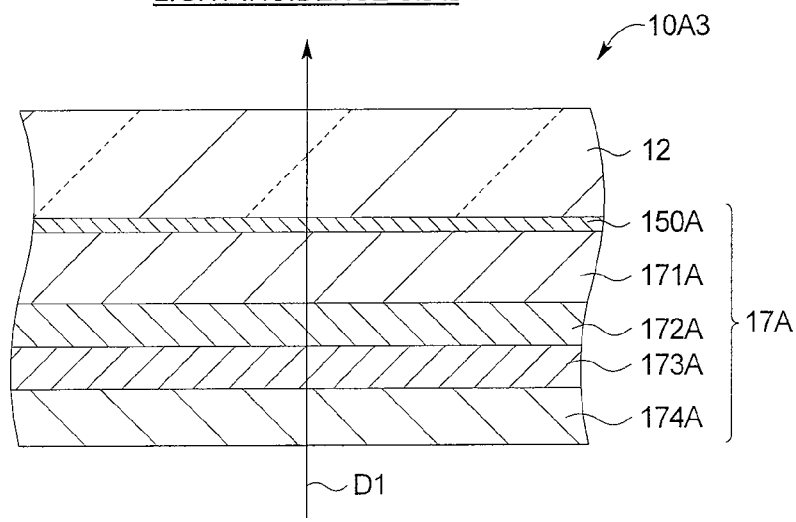
FIGS. 9A and 9B are diagrams illustrating a concrete stack structure and reflectance characteristic of a sealing sheet (light incidence side) according to modification 2.
Figure 9B:
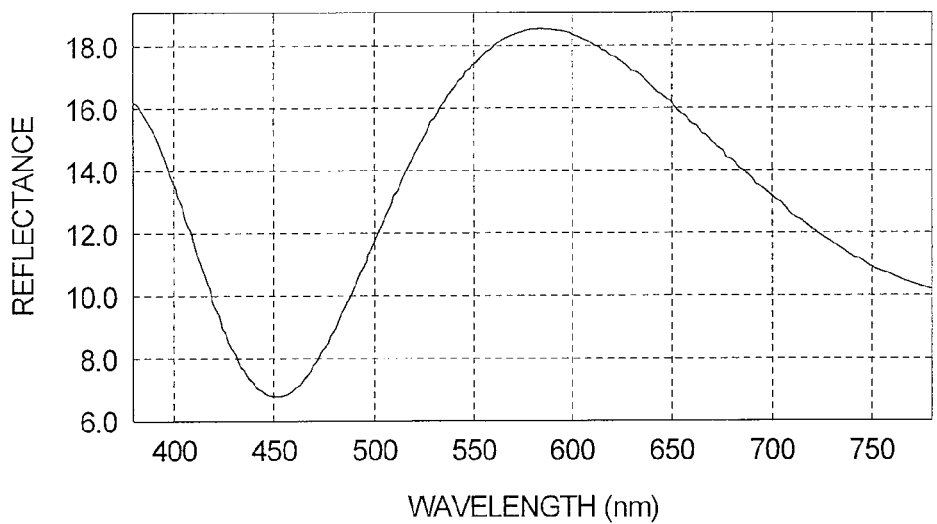

FIG. 9A illustrates a sectional stack structure of a sealing sheet 10A3 (the light incidence side) according to modification 2, and FIG. 9B illustrates the characteristic of reflectance at wavelength of the sealing sheet 10A3. The sealing sheet 10A3 is obtained by stacking, on the substrate 12, as a first inorganic stack layer 17A, for example, the SiOx film 150A, an $Al_2O_3$ film 171A, a $SiO_2$ film 172A, an $Al_2O_3$ film 173A, and an $SiO_2$ film 174A in this order. In the sealing sheet 10A3, the direction from the $SiO_2$ film 174A toward the substrate 12 is the blue light transmission direction (D1), and the blue light enters from the under face of the $SiO_2$ film 174A. Also in this modification, like in the modification 1, in the sealing sheet 10A3, the $Al_2O_3$ film 171A functions as a gas barrier layer suppressing invasion of moisture vapor and the like to the phosphor layer 11.

The thickness of each of the inorganic material films is as follows. The thickness of the $Al_2O_3$ film 171A is 138.95 nm, that of the $SiO_2$ film 172A is 76.9 nm, that of the $Al_2O_3$ film 173A is 55.16 nm, and that of the $SiO_2$ film 174A is 103.31 nm. The substrate 12 (thickness 100 μm) and the SiOx film 150A (thickness 2 nm) are similar to those of the foregoing embodiment.

By such a first inorganic stack film 17A, in the sealing sheet 10A3, for example, the reflectance characteristic as illustrated in FIG. 9B is displayed. Specifically, the reflectance in green light and red light is higher than that in blue light. Also in the modification, in a manner similar to the sealing sheet 10A1 in the embodiment, by the stack structure of the first inorganic stack film 17A, light reflection in blue light is suppressed and, on the other hand, light reflection in green and red light is promoted.

Stack Structure of Sealing Sheet 10B3 (Light Emitting Side)

Figure 10A:
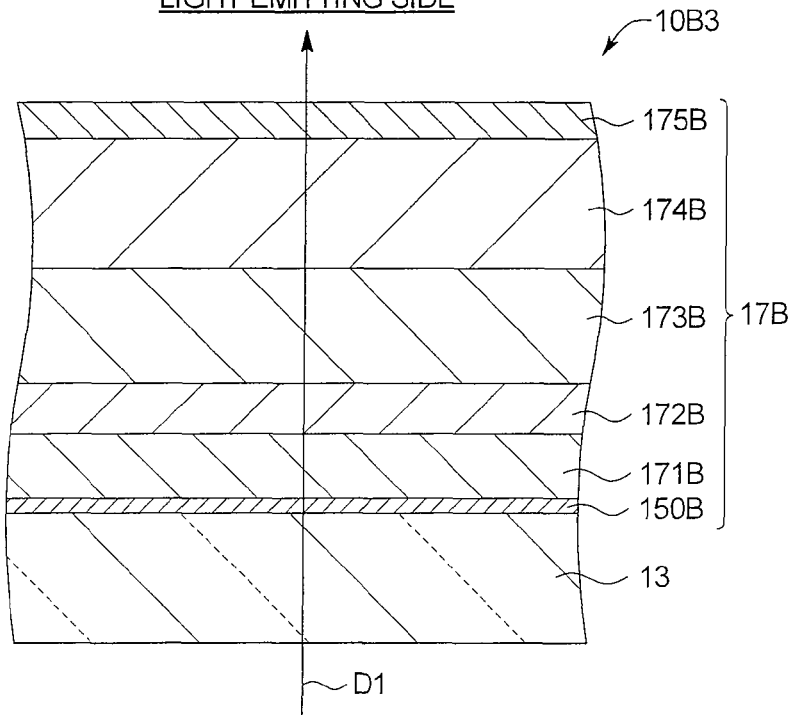
FIGS. 10A and 10B are diagrams illustrating a concrete stack structure and reflectance characteristic of a sealing sheet (light emitting side) according to modification 2.
Figure 10B:
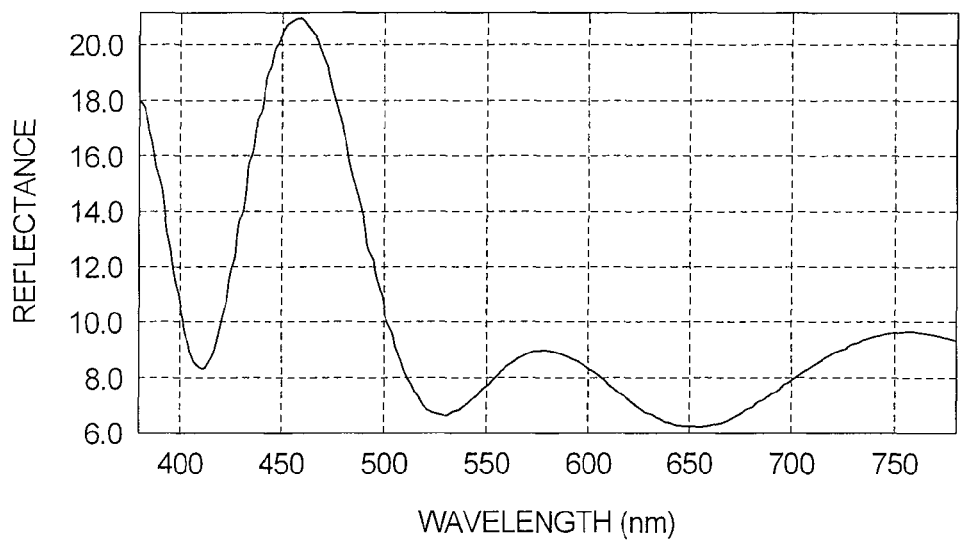

FIG. 10A illustrates a sectional stack structure of a sealing sheet 10B3 on the light emitting side, and FIG. 10B illustrates the characteristic of reflectance at wavelength of the sealing sheet 10B3. The sealing sheet 10B3 is obtained by stacking, on the substrate 13, as a second inorganic stack layer 17B, for example, the SiOx film 150B, a $SiO_2$ film 171B, an $Al_2O_3$ film 172B, an $SiO_2$ film 173B, an $Al_2O_3$ film 174B, and a $SiO_2$ film 175B in this order. In the sealing sheet 10B3, the direction from the substrate 13 to the $SiO_2$ film 175B is the blue light transmission direction (D1), and the white light as mixture of the blue, green, and red light goes out from the top face of the $SiO_2$ film 175B. In the sealing sheet 10B3, the $Al_2O_3$ film 172B functions as a gas barrier layer suppressing invasion of moisture vapor and the like to the phosphor layer 11.

The thickness of each of the inorganic material films is as follows. For example, the thickness of the $SiO_2$ film 171B is 126.52 nm. The $Al_2O_3$ film 172B is 77.79 nm, that of the $SiO_2$ film 173B is 256.57 nm, that of the $Al_2O_3$ film 174B is 213.19 nm, and that of the $SiO_2$ film 175B is 67.52 nm. The substrate 13 (thickness 100 μm) and the SiOx film 150B (thickness 2 nm) are similar to those of the foregoing embodiment.

By such a second inorganic stack film 17B, in the sealing sheet 10B3, for example, the reflectance characteristic as illustrated in FIG. 10B is displayed. Specifically, the reflectance in blue light is higher than the reflectance in green light and red light. Also in the modification, in a manner similar to the sealing sheet 10B1 in the embodiment, by the stack structure of the second inorganic stack film 17B, light reflection in blue light is promoted and, on the other hand, light reflection in green and red light is suppressed.

In the modification, the sealing sheets 10A3 and 10B3 have the predetermined reflectance characteristics similar to those of the embodiment, so that blue light as excitation light is efficiently taken in the phosphor layer 11 and, on the other hand, green light and red light generated by color conversion is efficiently extracted. Therefore, effects similar to those of the foregoing embodiment are obtained. That is, the first and second inorganic stack films 17A and 17B may employ a stack structure using an $Al_2O_3$ film as a gas barrier layer and also using a $SiO_2$ film.

Modification 3

Figure 11A:
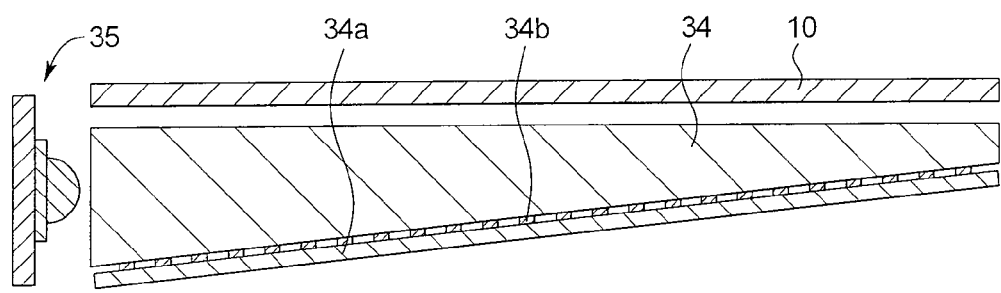
FIGS. 11A and 11B are cross sections each illustrating a sectional configuration of an illumination device according to modification 3.
Figure 11B:
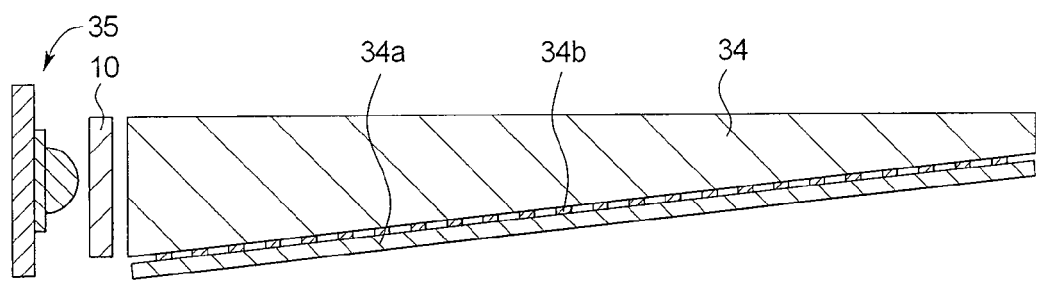

FIGS. 11A and 11B illustrate a sectional structure of an illumination device according to Modification 3. The illumination device of Modification 3 uses, as a light source unit, a light guide plate 34 performing surface emission by making light from the blue LED 35 propagate. A light reflector 34a and a light diffuser 34b are provided on the bottom face of the light guide plate 34. The phosphor sheet 10 is not limited to a light source in which a plurality of blue LEDs are disposed on a substrate but may be combined with the light guide plate 34 as in the modification. In this case, by adhering the phosphor sheet 10 to the surface (light emission surface) on the light emitting side of the light guide plate 34 as illustrated in FIG. 11A, blue light emitted from the light emission surface of the light guide plate 34 as excitation light, and white light may be extracted. Alternatively, by adhering the phosphor sheet 10 to the surface (side face) on the light incidence side of the light guide plate 34, blue light from the blue LED 35 may be directly taken and white light may be emitted to the inside of the light guide plate 34. In such a manner, the phosphor sheet 10 is applicable also to a backlight using the light guide plate 34.

Although the embodiment and the modifications have been described above, the present application is not limited to the embodiments and the like but may be variously modified. For example, although the case of generating green light and red light by color conversion using blue light as excitation light has been described in the embodiment and the like, the present application is not limited to the case. According to the kind of the phosphor, orange color and yellow color may be generated. Light taken from the phosphor sheet 10 is not limited to white light but may be another-color light in accordance with the use and purpose.

In the embodiment, the silicon oxide film having oxygen defect is provided for each of the sealing sheets on the light incidence side and the light emitting side. However, the silicon oxide film may not be formed. As long as the phosphor layer 11 is sandwiched by a pair of sealing sheets and each of the sealing sheets has the above-described reflectance characteristic, the effects of the present invention are obtained.

Further, in the embodiment, although the stack structures of the inorganic stack films in each sealing sheet have been described by concrete materials and film thicknesses, the inorganic stack film of the invention is not limited to them. By stacking at least three inorganic material films and properly setting the film thicknesses, the reflectance characteristic as described above is realized.

In addition, in the embodiment, a process according to a so-called sheet-feed method has been described above as an example of the process of manufacturing the phosphor sheet 10. However, the invention is not limited to the process. A so-called roll-to-roll process may be used. In this case, for example, a process of forming a sealing sheet by sequentially forming inorganic stack films on one face of a sheet-roll-shaped base material and a process of printing a phosphor layer on the other face of the base material may be performed continuously or in a lump. After that, slits are formed so as to form phosphor sheets in desired size and the sheets are cut. In a manner similar to the above-described process, the sealing sheets are adhered to each other.

In the embodiment, the configuration that the illumination device is made by the light source unit 2 and the phosphor sheet 10 has been described as an example. The invention however is not limited to the configuration. For example, other optical function layers such as the diffuser 5, the diffusion film 6, the lens film 7, the reflection-type polarization film 8, and the like may be provided. That is, it is sufficient to include the light source unit and the phosphor sheet.

Further, in the embodiment, the configuration of using the liquid crystal panel as the display panel of the display device of the present invention has been described above as an example. However, the invention is not limited to the configuration but is applicable to other display devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A color conversion sheet comprising:
a color conversion layer converting a part of first color light as incident light to second color light having a wavelength longer than that of the first color light; and
a pair of sealing sheets sandwiching the color conversion layer from a light incidence side and a light emitting side and each having an inorganic stack film on a substrate,
wherein reflectance of the sealing sheet on the light incidence side to the second color light is higher than that to the first color light, and reflectance of the sealing sheet on the light emitting side to the first color light is higher than that to the second color light.

2. The color conversion sheet according to claim 1, wherein each of the first and second inorganic stack films has a silicon nitride (SiN) film on the substrate.

3. The color conversion sheet according to claim 2, wherein each of the first and second inorganic stack films has a silicon oxide film (SiOx: $1.5 \leq x \leq 1.7$) between the substrate and the silicon nitride film.

4. The color conversion sheet according to claim 3, wherein each of the first and second inorganic stack films further has a silicon dioxide ($SiO_2$) film on the substrate.

5. The color conversion sheet according to claim 4, wherein the first inorganic stack film is obtained by stacking the silicon oxide film, a silicon nitride film, a silicon dioxide film, and a silicon nitride film in this order on the substrate, and
the second inorganic stack film is obtained by stacking the silicon oxide film, a silicon nitride film, a silicon dioxide film, a silicon nitride film, and a silicon dioxide film in this order on the substrate.

6. The color conversion sheet according to claim 1, wherein each of the first and second inorganic stack layers has an aluminum oxide ($Al_2O_3$) film on the substrate.

7. The color conversion sheet according to claim 6, wherein each of the first and second inorganic stack layers has a silicon oxide film (SiOx: $1.5 \leq x \leq 1.7$) between the substrate and the aluminum oxide film.

8. The color conversion sheet according to claim 7, wherein each of the first and second inorganic stack layers has a titanium dioxide ($TiO_2$) film on the substrate.

9. The color conversion sheet according to claim 8, wherein the first inorganic stack film is obtained by stacking the silicon oxide film, a titanium dioxide film, an aluminum oxide film, a titanium dioxide film, and an aluminum oxide film in this order on the substrate, and
the second inorganic stack film is obtained by stacking the silicon oxide film, an aluminum oxide film, a titanium dioxide film, an aluminum oxide film, a titanium dioxide film, and an aluminum oxide film in this order on the substrate.

10. The color conversion sheet according to claim 7, wherein each of the first and second inorganic stack layers has a silicon dioxide film ($SiO_2$) on the substrate.

11. The color conversion sheet according to claim 10, wherein the first inorganic stack film is obtained by stacking the silicon oxide film, an aluminum oxide film, a silicon dioxide film, an aluminum oxide film, and a silicon dioxide film in this order on the substrate, and
the second inorganic stack film is obtained by stacking the silicon oxide film, a silicon dioxide film, an aluminum oxide film, a silicon dioxide film, an aluminum oxide film, and a silicon dioxide film in this order on the substrate.

12. The color conversion sheet according to claim 1, wherein the first color light is blue light.

13. The color conversion sheet according to claim 12, wherein white light is emitted to the light emitting side.

14. An illumination device comprising:
a color conversion sheet; and
a light source unit emitting first color light toward the color conversion sheet,
wherein the color conversion sheet includes
a color conversion layer converting a part of the first color light to second color light having a wavelength longer than that of the first color light, and
a pair of sealing sheets sandwiching the color conversion layer from a light incidence side and a light emitting side and each having an inorganic stack film on a substrate, and
reflectance of the sealing sheet on the light incidence side to the second color light is higher than that to the first color light, and reflectance of the sealing sheet on the light emitting side to the first color light is higher than that to the second color light.

15. The illumination device according to claim 14, wherein the light source unit is made by a plurality of light emitting diodes disposed in a plane parallel to the color conversion sheet.

16. The illumination device according to claim 14, wherein the light source unit comprises:
a light guide plate having a light emission face parallel to the color conversion sheet; and
a light emitting diode emitting first color light toward the inside of the light guide plate.

17. The illumination device according to claim 14, wherein the first color light is blue light.

18. The illumination device according to claim 17, wherein white light is emitted toward the light emitting side.

19. A display device comprising:
a display panel displaying an image;
a light source unit emitting first color light; and
a color conversion sheet provided between the display panel and the light source unit,
wherein the color conversion sheet includes
a color conversion layer converting a part of first color light to second color light having a wavelength longer than that of the first color light, and a pair of sealing sheets sandwiching the color conversion layer from a light incidence side and a light emitting side and each having an inorganic stack film on a substrate, and reflectance of the sealing sheet on the light incidence side to the second color light is higher than that to the first color light, and reflectance of the sealing sheet on the light emitting side to the first color light is higher than that to the second color light.

20. The display device according to claim 19, wherein the first color light is blue light, and white light is emitted to the light emitting side.

* * * * *